United States Patent
Fukuoka

(10) Patent No.: US 7,272,659 B2
(45) Date of Patent: Sep. 18, 2007

(54) INFORMATION REWRITING METHOD, RECORDING MEDIUM STORING INFORMATION REWRITING PROGRAM AND INFORMATION TERMINAL DEVICE

(75) Inventor: Norio Fukuoka, Yokohama (JP)

(73) Assignee: Olympus Corporation, Tokyo (JP)

( * ) Notice: Subject to any disclaimer, the term of this patent is extended or adjusted under 35 U.S.C. 154(b) by 871 days.

(21) Appl. No.: 10/601,431

(22) Filed: Jun. 23, 2003

(65) Prior Publication Data

US 2004/0201591 A1   Oct. 14, 2004

(30) Foreign Application Priority Data

Jun. 25, 2002   (JP) ............... 2002-184599

(51) Int. Cl.
*G06F 15/16* (2006.01)
(52) U.S. Cl. ................................. 709/231
(58) Field of Classification Search ............. 709/231
See application file for complete search history.

(56) References Cited

U.S. PATENT DOCUMENTS

| | | | |
|---|---|---|---|
| 6,014,706 A * | 1/2000 | Cannon et al. | 709/231 |
| 6,151,622 A * | 11/2000 | Fraenkel et al. | 709/205 |
| 6,754,715 B1 * | 6/2004 | Cannon et al. | 709/231 |
| 6,950,983 B1 * | 9/2005 | Snavely | 715/513 |
| 2002/0006266 A1 * | 1/2002 | Yoon et al. | 386/69 |
| 2004/0205213 A1 * | 10/2004 | Paz et al. | 709/231 |

* cited by examiner

*Primary Examiner*—Krisna Lim
(74) *Attorney, Agent, or Firm*—Volpe and Koenig PC

(57) ABSTRACT

The information rewriting method includes, defining to divide a display image of a monitor into a plurality of frames, the first group of frames being defined such that occurrence of an event corresponding to a mark or a marked indicator in a display region is recognizable, and the second group of frames being defined such that when data corresponding to the event that occurs in connection with the first group of frames are transferred from the server, the received data are stored in the storage as the data for the second group of frames, transferring the data from the server as data for the second group of frames and storing the data in an applicable storage of the processing terminal, and executing renewal of an image or reproduction of sound with the data stored in the storage as the data for the second group of frames.

20 Claims, 6 Drawing Sheets

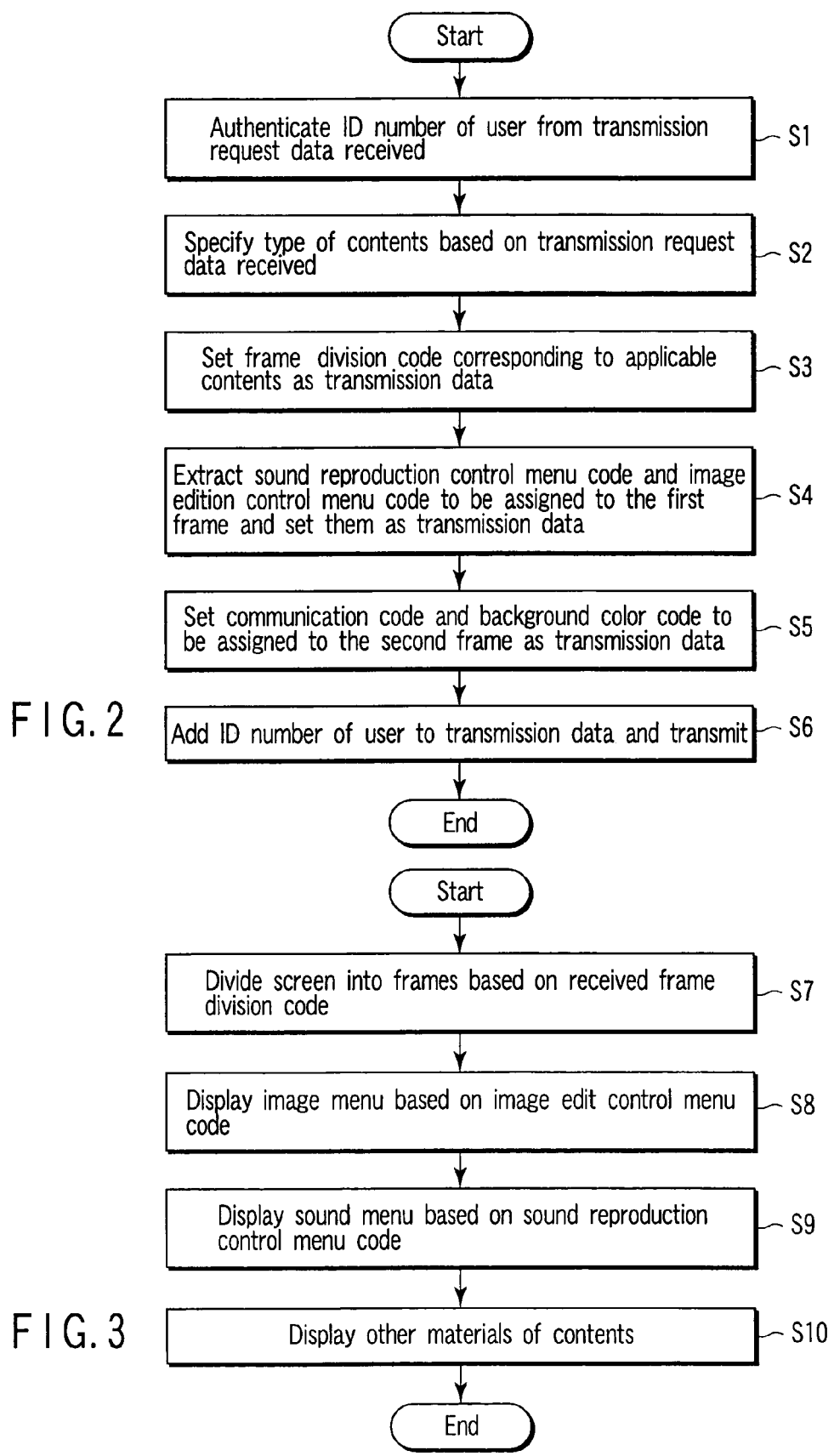

INFORMATION REWRITING METHOD, RECORDING MEDIUM STORING INFORMATION REWRITING PROGRAM AND INFORMATION TERMINAL DEVICE

CROSS-REFERENCE TO RELATED APPLICATIONS

This application is based upon and claims the benefit of priority from the prior Japanese Patent Application No. 2002-184599, filed Jun. 25, 2002, the entire contents of which are incorporated herein by reference.

BACKGROUND OF THE INVENTION

1. Field of the Invention

The present invention relates to a data transfer method, data transfer program, storage medium and terminal, by which data received from a server can be rewritten at a high efficiency in a short period of time.

2. Description of the Related Art

Recent years, services that transmit a great amount of image information and sound information at a high speed through the Internet are becoming more popular. One of the examples of the services is a digital communication network called broadband. The broadband is very useful, but it entails some drawbacks such as the service fee being still very high and having to prepare expensive device and software application.

Meanwhile, document modification information such as the size of characters and a layout, information indicating the attribution of data, and the like are directly embedded in a text using a markup language such as HTML, and they are transmitted or received with the text. It is well known that when embedding information, a location where an image file is displayed, and a link can be specified. Further, a page containing a still image, moving image, sound and the like can be also expressed, and such pages stored in a WWW server on the Internet are frequently transmitted and received to be browsed with use of a WWW browser. Transmission of the data that express a page is carried out usually in units of data corresponding to one display image (1 frame).

Further, in order to update the data that expresses a page, or to obtain the corresponding data by accessing, for example, a sound information resource such as for music, that relates to the image displayed on the page, all the data that correspond to a respective page are updated as one object, and therefore new data are transmitted and received. In the case where a display on the screen of a local computer is partially updated, the data corresponding to the entire display image (1 whole frame) that contains the portion to be updated, are transmitted and received between the local computer and a remote computer (server). In the above-described conventional technique, even if data to be updated or to be newly obtained is merely a part of the data corresponding to one entire display image (1 whole frame), the data of that entire display image (1 whole frame) are transmitted and received in any case. In this manner, a great amount of data that contains data items that correspond to a portion need not be changed, which therefore need not be transmitted or received, is transferred anyway, and thus its transmission line is occupied wastefully. Further, it takes a considerable amount of time to be prepared for the transmission and reception of the data.

In extreme cases, while browsing data on the Internet with use of the WWW browser, for example, each time some kind of an event is created with regard to one display image (1 frame) of a terminal by pressing on a key, moving of the mouse, clicking on an operation button or the like, the transmission and reception of all the data of the image always occur. As a result, the efficiency for transmission and reception of necessary data becomes poor and in many cases, the response property is not satisfactory for the users.

BRIEF SUMMARY OF THE INVENTION

According to a first aspect of the present invention, there is provided an information rewriting method comprising: defining to divide a display image of a monitor applied to a processing terminal on a user side into a plurality of frames, the divided frames being defined to include at least a first group of frames and second group of frames, wherein the first group of frames are defined to recognize occurrence of an event corresponding to a mark or a marked indicator in a display region of the monitor, and the second group of frames are defined when data corresponding to the event that occurs in connection with the first group of frames are transferred from the server to store received data in a storage as the data for the second group of frames; substantially limiting the data to those corresponding to information specified based on the event that occurred in connection with the first group; transferring the limited data from the server as data for the second group of frames; storing the data in the storage of the processing terminal; and executing renewal of an image or reproduction of sound which corresponds to the event in connection with the first group of frames, with the data stored in the storage as the data for the second group of frames.

According to a third aspect of the present invention, there is provided a recording medium storing information rewriting program for use on a computer to execute: a function of defining to divide a display image of a monitor applied to a processing terminal of a user into a plurality of frames, wherein of the divided frames, a first group of frames are defined to recognize occurrence of an event corresponding to a mark or a marked indicator in a display region of the monitor, and a second group of frames are defined when data corresponding to the event that occurs in connection with the first group of frames are transferred from the server to store received data in a storage as the data for the second group of frames; a function of substantially limiting the data to those corresponding to information specified based on the event that occurred in connection with the first group, transferring the limited data from the server as data for the second group of frames, and storing them in the storage of the processing terminal; and a function of executing the renewal of an image or reproduction of sound or the like, which corresponds to the event in connection with the first group of frames, with the data stored in the storage as the data for the second group of frames.

According to a fourth aspect of the present invention, there is provided an information terminal device comprising: a display region defining function unit configured to define to divide a display image of a monitor applied to a processing terminal of a user into a plurality of frames, of the divided frames, the first group of frames are defined to recognize occurrence of an event corresponding to a mark or a marked indicator in a display region of the monitor, and the second group of frames are defined, when data corresponding to the event that occurs in connection with the first group of frames, are transferred from the server, to store received data in a storage as the data for the second group of frames; and a data transfer control unit configured to substantially limit the data to those corresponding to information specified based on the event that occurred in connection with the first group, transfer the limited data from the server as data for the second group of frames, store them in the storage of the processing terminal, and execute the renewal of an image or reproduction of sound, which corresponds to the event in connection with the first group of frames, with the data stored in the storage as the data for the second group of frames.

According to a fifth aspect of the present invention, there is provided an information rewriting method of an information terminal device which receives information transmitted from a server through a communication line, and rewrites stored information associated with the received information, the information rewriting method comprising: dividing a browser image displayed on the information terminal device into a first frame for use in selecting event information and a second frame different from the first frame, and issuing a first command for requesting the server to transmit related information associated with the first and second frames; storing in a storage unit, divided image information and the related information associated with the first and second frames, which are transmitted from the server in response to the first command; displaying at least an image for use in selecting event information, in the first frame based on the divided image information and the related information; recognizing the event information selected in the first frame image as event information selected in the second frame, and issuing a second command for requesting the server to transmit information associated with the event information, based on the related information associated with the second frame which is stored in the storage unit; and recognizing new information transmitted from the server in response to the second command, as the information associated with the second frame, and rewriting information stored in the storage unit as information associated with the event information selected in the first frame into the recognized new information.

According to a sixth aspect of the present invention, there is provided a recording medium storing information rewriting program for controlling an information terminal device which receives specific information transmitted from a server through a communication line, and which rewrites stored information associated with the specific information, the program causing a computer to perform: a function of dividing a browser image displayed on the information terminal device into a first frame for use in selecting event information and a second frame different from the first frame, and issuing a first command for requesting the server to transmit related information associated with the first and second frames; a function of storing in a storage unit, divided image information and the related information associated with the first and second frames, which are transmitted from the server in response to the first command; a function of causing at least an image for use in selecting event information to be displayed in the first frame of the information terminal device based on the divided image information and the related information; a function of recognizing the event information selected in the first frame image as event information selected in the second frame, and issuing a second command for requesting the server to transmit information associated with the event information, based on the related information associated with the second frame which is stored in the storage unit; and a function of recognizing new information transmitted from the server in response to the second command, as the information associated with the second frame, and rewriting information stored in the storage unit as information associated with the event information selected in the first frame into the recognized new information.

According to a seventh aspect of the present invention, there is provided an information rewriting method of an information terminal device which receives information transmitted from a server through a communication line, and rewrites stored information associated with the received information, the information rewriting method comprising: a step of dividing a browser image displayed on the information terminal device into a first frame for use in selecting event information and a second frame different from the first frame, and issuing a first command for requesting the server to transmit related information associated with the first and second frames; a step of storing divided image information and the related information associated with the first and second frames, which are transmitted from the server in response to the first command, in a storage unit; a step of displaying at least an image for use in selecting event information, in the first frame based on the divided image information and the related information; a step of recognizing the event information selected in the first frame image as event information selected in the second frame; and issuing a second command for requesting the server to transmit information associated with the event information, based on the related information associated with the second frame which is stored in the storage unit; a step of recognizing new image information and new sound information which are transmitted from the server in response to the second command, as the information associated with the second frame, and rewriting information stored in the storage unit as information associated with the event information selected in the first frame into the recognized new image and sound information; a step of replacing an image corresponding to image information selected in the first frame by the new image information, and re-displaying the new image information; and a step of causing a sound reproduction unit to reproduce sound information associated with the event information selected in the first frame.

According to a eighth aspect of the present invention, there is provided An information terminal device which receives information transmitted from a server through a communication line, and rewrites stored information associated with the received information, the information terminal device comprising: display control means for dividing a browser image displayed on the information terminal device into a first frame and a second frame based on the information transmitted from the server, the first frame functioning to select event information, the second frame functioning to perform rewriting based on reply information related to the event information, and also reproduce the reply information; recognition means for detecting the event information selected in first frame image, and recognizing the detected event information as event information selected in the second frame; event-associated information requesting means for requesting the server to transmit information associated with the recognized event information; and information rewriting means for recognizing new information transmitted from the server as the information associated with the second frame, based on the information associated with the event information, and rewriting information associated with the event information selected in the first frame into the new information, wherein the display control means rewrites a corresponding region of the first frame in the browser image based on an output of the information rewriting means.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a flowchart illustrating the process of transmitting contents;

FIG. 3 is a flowchart illustrating the operation of displaying an image of contents;

DETAILED DESCRIPTION OF THE INVENTION

Figure 1:
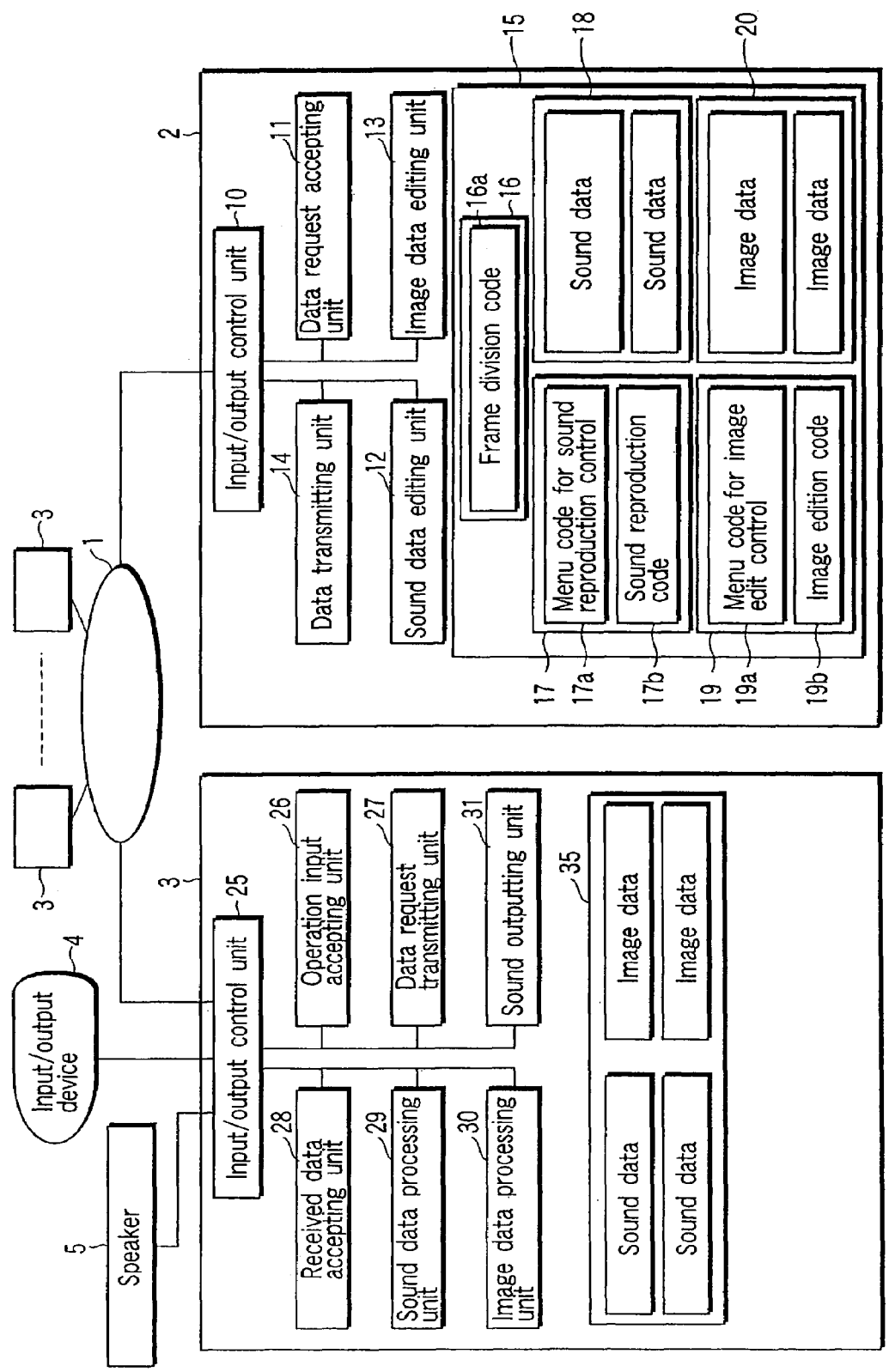
FIG. 1 is a diagram showing the structure of an information providing system.

FIG. 1 is a diagram showing the structure of an information providing system to which the present invention is applied.

This information providing system includes a service providing server 2 (to be called "server 2" hereinafter) connected to a communication network 1, and a plurality of user terminals 3.

In the method of the present invention that is applied to the information providing system, an image display of the monitor applied to a user terminal 3, which is a processing terminal on the user side is divided into a plurality of frames when a display image is defined.

When defining of the divided frames, these frames are defined to include at least a first group frame and second group frame, the first group frame being defined such that occurrence of an event corresponding to a mark or a marked indicator in a display region of the monitor is recognizable, and the second group frame being defined such that when data corresponding to the event that occurs in connection with the first group frame, are transferred from the server, thus received data are stored in the storage as the data for the second group frame. Then, the data is substantially limited to those corresponding to information specified based on the event that occurred in connection with the first group, and thus limited data is transferred from the server as data for the second group frame and stored in an applicable storage of the processing terminal. With the data stored in the storage as the data for the second group frame, renewal of an image or reproduction of sound or the like, which corresponds to the event in connection with the first group frame is executed.

Note that the first frame that will be later explained is an example of the above-described first group frame, and the second frame that will be later explained is an example of the above-described second group frame.

The server 2 is an information processing terminal such as a computer owned by a service provider that provides transaction services.

On the other hand, the user terminal 3 is an information processing terminal set up such that it can be arbitrarily operated by a user who wishes to receive information providing services. The user terminal 3 is provided with an input/output device 4 designed to carry out inputting/outputting of information between the user and the terminal, and a speaker 5 that can output sounds.

The server 2 includes an input/output control unit 10, a data request accepting unit 11, a sound data editing unit 12, an image data editing unit 13, a data transmitting unit 14 and a contents data memory 15. The contents data memory 15 is provided in a section of a storage within the server 2 or connected to the server 2 from outside.

The input/output control unit 10 is an interface used to make homepages open to the public on a communication network 1, and to receive various information from the user terminal 3 and exchange various kinds of information. The data request accepting unit 11, upon reception of an information transmission request from the user terminal 3, initiates the sound data editing unit 12 and image data editing unit 13 in compliance with the contents of the request. The sound data editing unit 12 extracts and edits sound data to be transmitted to the user terminal 3, and then sets thus edited sound data as transmission data. The image data editing unit 13 extracts and edits image data to be transmitted to the user terminal 3, and then sets thus edited image data as transmission data. The data transmitting unit 14 transmits thus edited sound data and image data to the user terminal 3.

The contents data memory 15 stores contents provided for each types of transaction services. The contents data memory 15 includes a frame division code memory 16, a sound code memory 17, a sound data memory 18, an image code memory 19 and an image data memory 20.

The frame division code memory 16 stores a frame division code 16a that designates a region to display the contents of services provided, to the input/output device 4 of the user terminal 3.

The sound code memory 17 stores a sound reproduction control menu code 17a and a sound reproduction code 17b. The sound reproduction control menu code 17a is an instruction code used to display menu information for a user to select a desired sound. The sound reproduction code 17b is an instruction code used to reproduce the sound via the speaker 5 of the user terminal 3.

The sound data memory 18 stores sound data. There are a plurality of sound data prepared for each of the contents, and they are associated with the respective content such as to be selected via the sound reproduction control menu code 17a. That is, the sound reproduction control menu code 17a includes a file ID of each sound data to be used. The sound data is subjected to a process based on the sound reproduction code 17b and reproduced as a sound.

The image code memory 19 stores an image edit control menu code 19a and an image edit code 19b. The image edit control menu code 19a is an instruction code used to display menu information for a user to select a desired image. The image edit code 19b is an instruction code used to display the image on the input/output device 4 of the user terminal 3.

The image data memory 20 stores image data. There are a plurality of image data prepared for each content, and they are associated with the respective content such as to be selected via the image edit control menu code 19a. That is, the image edit control menu code 19a includes a file ID of each image data to be used. The image data is subjected to a process based on the image edit code 19b and displayed as an image.

On the other hand, the user terminal 3 includes an input/output control unit 25, an operation input accepting unit 26, a data request transmitting unit 27, a received data accepting unit 28, a sound data processing unit 29, an image data processing unit 30, a sound outputting unit 31 and a data buffer unit 35. The data buffer 35 is provided in a section of a storage within the user terminal 3 or connected to the terminal from outside.

The input/output control unit 25 is an interface used to receive data transmitted from the server 2 and exchange various types of information. The operation input accepting unit 26, upon receiving an operation input from the input/output device 4, specifies necessary data. The data request transmitting unit 27 requests the server 2 to transmit the specified data.

The received data accepting unit 28 accepts the data transmitted from the server 2 and initiates the sound data processing unit 29 or the image data processing unit 30 in compliance with the contents of the data. The sound data processing unit 29 converts the received sound data, and outputs it to the speaker 5 via the sound outputting unit 31. The image data processing unit 30 extracts an image desired by the user out of the image data received, and displays it on the input/output device. The data buffer unit 35 stores the sound data and image data received from the server 2 via the communication network 1.

Next, the operation of an information providing system will now be described.

A user who wishes to receive provided services requests the display of the contents through the input/output device 4. The operation input accepting unit 26 generates data of requesting the transmission of contents in reply to an operation made by the user, that is, an occurrence of an event. The transmission request data is formed to contain the type of the contents and the ID number of the user. Then the data request transmission unit 27 transmits the request data to the server 2.

In the server 2, the data request accepting unit 11 is initiated and thus the contents requested by the user terminal 3 are transmitted.

FIG. 2 is a flowchart of the transmission process in the server 2.

In Step S1, the data request accepting unit 11 reads out the ID number of the user from the transmission request data received, and authenticate the ID number. In other words, the data request accepting unit 11 checks if the ID number is admitted or not, and if admitted, the process can proceed from that point on.

In Step S2, the data request accepting unit 11 specifies the type of the contents requested based on the transmission request data received. In Step 3, the data request accepting unit 11 searches through the contents data memory 15 for the data corresponding to the specified contents, and sets an applicable frame division code 16a as transmission data. When the frame division code 16a is received by the user terminal 3, the form of the frame division of the displayed image is defined based on the frame division code 16a. The frame division code 16a serves as an instruction for dividing the image into, for example, two frames.

In Step S4, the sound data editing unit 12 and image data editing unit 13 edit the first frame set on the display image of the user terminal 3, and therefore necessary sound reproduction control menu code 17a and image edit control menu code 19a are extracted and set as transmission data together with other display codes (for example, the pull-down menu).

Of the two frames set on the display image of the user terminal 3, the second frame is not designed to display any indications within its region, but it is a region set to obtain data used to execute editing, which will be explained later. Therefore, the second frame is set such as not to be seen by the user. In Step S5, an empty document containing only a code that set the height of the frame to 0, a communication code between the user terminal 3 and server 2 and a code that designates the background color is set as transmission data. In Step S6, the data transmitting unit 14 adds the ID number of the user to the transmission data, and transmits it to the user terminal 3.

Meanwhile, in the user terminal 3, the received data accepting unit 28 is initiated, and an image is displayed on the input/output device 4 based on the codes transmitted from the server 2.

Figure 4:
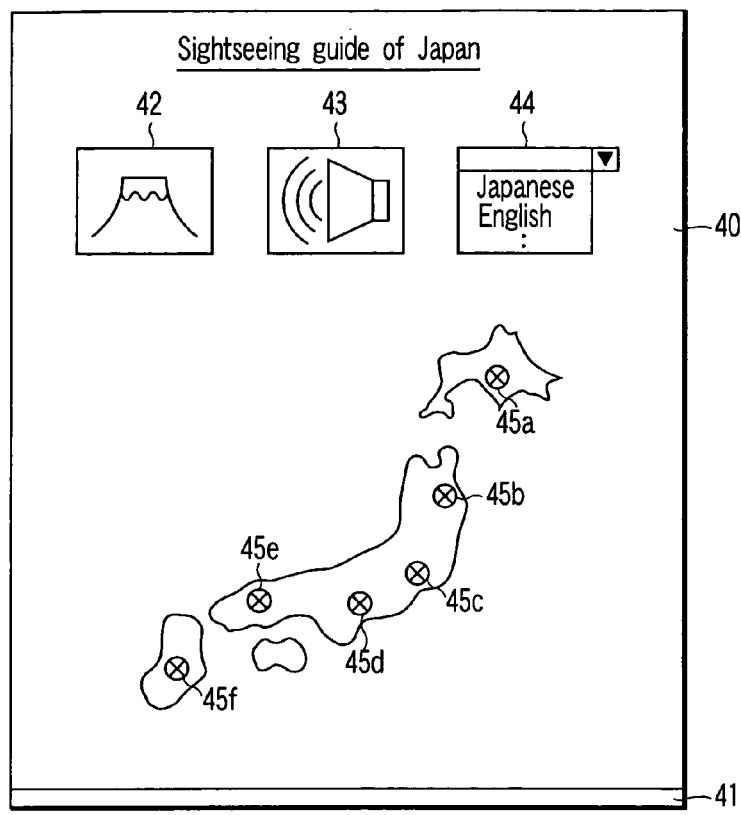
FIG. 4 is a diagram illustrating an image of contents.

FIG. 3 is a flowchart illustrating the operation of displaying the contents on the user terminal 3, and FIG. 4 is a diagram showing an example of the contents image.

In Step S7, the received data accepting unit 28 divides the display on the screen into a plurality of frames based on the above-described frame division code received from the server 2. In the example shown in FIG. 4, the display is divided into a first frame 40 and a second frame 41. The second frame, as already described, is used as an edit frame and its height is set to 0. Therefore, the presence of the second frame can be recognized but it is in a hidden state. The second frame functions as a work area in which data for the processing of displaying contents and the processing of image data and sound data are transferred and received in reply to the occurrence of an event in the first frame.

More specifically, the data processing is carried out in the input/output controlling unit 25 based on the data in the data buffer unit 35 in which "sound control data" or "image control data" are stored. These control data are used to store programs and the like used to transmit a request to the server 2 upon recognition of the contents such as sound or image or the like selected in accordance with the frame information regarding the second frame as well as the occurrence of an event, for example, clicking on a mouse button which occurred in the first frame.

In Step S8, the received data accepting unit 28 displays an image menu in the first frame based on the image edit control menu code 19a received. In the example shown in FIG. 4, a map of Japan with image menu icons 45a to 45f each indicating a sightseeing spot and an image display region 42 are displayed on the screen.

In Step S9, the received data accepting unit 28 displays a sound menu based on the sound reproduction control menu code 17a received. In the example shown in FIG. 4, a map of Japan with sound menu icons 45a to 45f each indicating a sightseeing spot and a sound icon 43 are displayed on the screen. In this embodiment, the image menu icons and sound menu icons are displayed in common, but it is alternatively possible that they are displayed to be separate from each other.

In Step S10, the received data accepting unit 28 displays the other indications regarding the display of the contents. In FIG. 4, a pull down menu 44 designed to assign a language used in this service is displayed.

As described, in the stage where the image indicating the contents is displayed, image data and sound data that express the entities of the image and sound associated with the displayed image are not transferred from the server 2 to the user terminal 3, but only the data expressing the image menu and sound menu, which involves a small amount of data, are transferred. With this structure, the data communication amount can be dramatically reduced as compared to the conventional method in which all the data regarding the image display (frames) are transferred (transmitted) at one time.

Next, the operation of the information providing system will now be described with reference to the contents display shown in FIG. 4.

Figure 5:
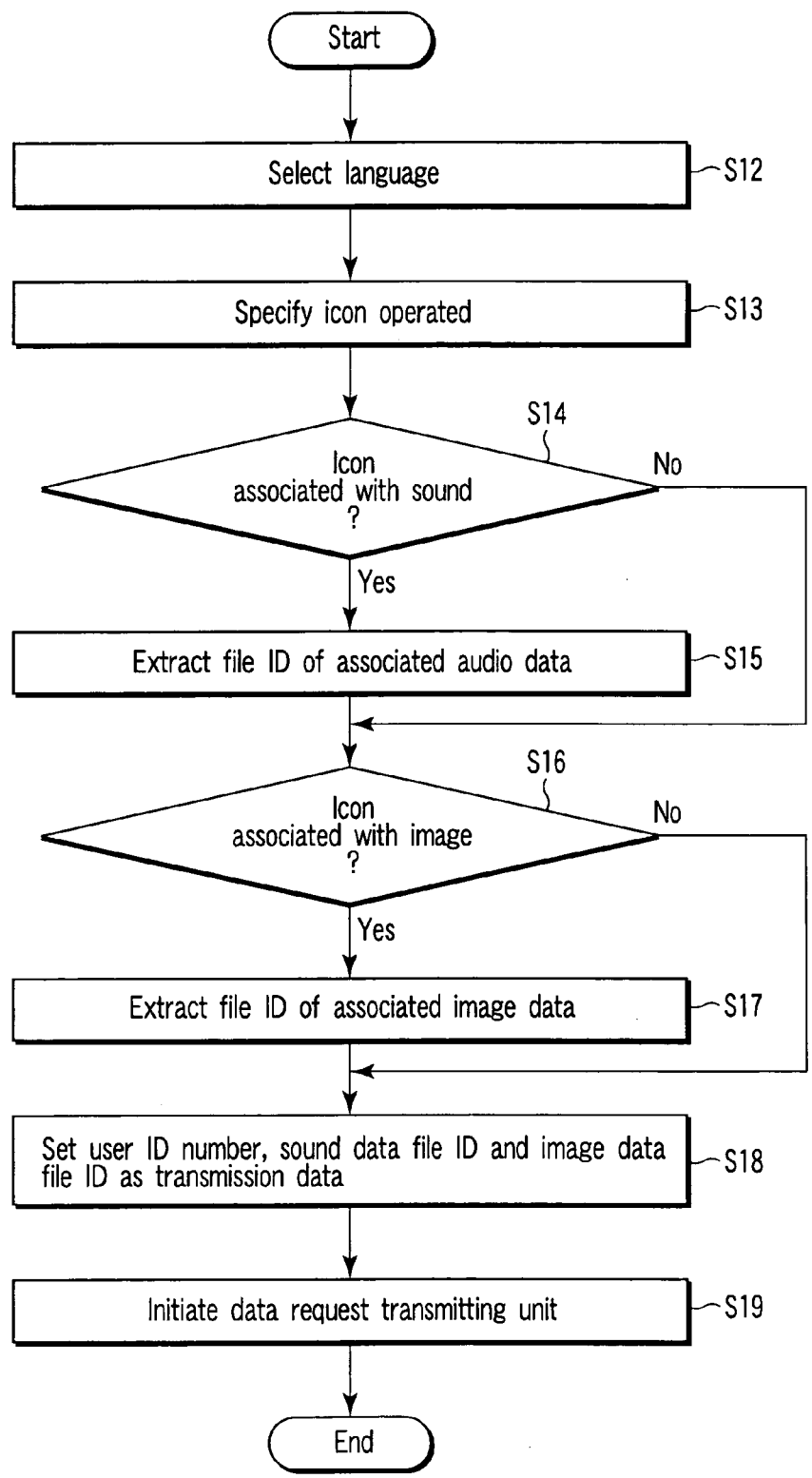
FIG. 5 is a flowchart illustrating the operation of an operation input accepting unit based on an operation input made by a user.

FIG. 5 is a flowchart illustrating the operation of the operation input accepting unit 26 based on the input operation by the user.

In Step S12, the user selects a language to be used in this contents display from the pull-down menu 44. Then, the contents display is expressed in the selected language and the voice that is associated with this display is generated in the selected language.

In Step S13, when the user superimposes the mouse pointer on an icon or clicks the mouse on the icon, the event is made to occur, for example, using the event attribute of the tag, and the operation input accepting unit 26 identifies the icon selected with the mouse. In Step S14, the operation input accepting unit 26 checks if the icon is associated with any sound or not. In Step S14, if it is "Yes", that is, there is an associated sound, the operation proceeds to Step S15, in which the operation input accepting unit 26 acquires a sound data file ID, which is the information for specifying the sound data.

In Step S16, the operation input accepting unit 26 checks if the icon is associated with any image or not. In Step S16, if it is "Yes", that is, there is an associated image, the operation proceeds to Step S17, in which the operation input accepting unit 26 acquires an image data file ID, which is the information for specifying the image data.

In Step S18, the operation input accepting unit 26 sets the sound data file ID and image data file ID as the event information together with the ID number of the user and the kind of language. Then, in Step S19, the data request transmitting unit 27 is initiated. The data request transmitting unit 27 transmits the event information using the communication code set to correspond to the second frame. Note that the event information may be the address designating the image data and/or sound data stored in the server 2.

The server 2 extracts the applicable sound data or image data based on the event information transmitted from the user terminal 3.

Figure 6:
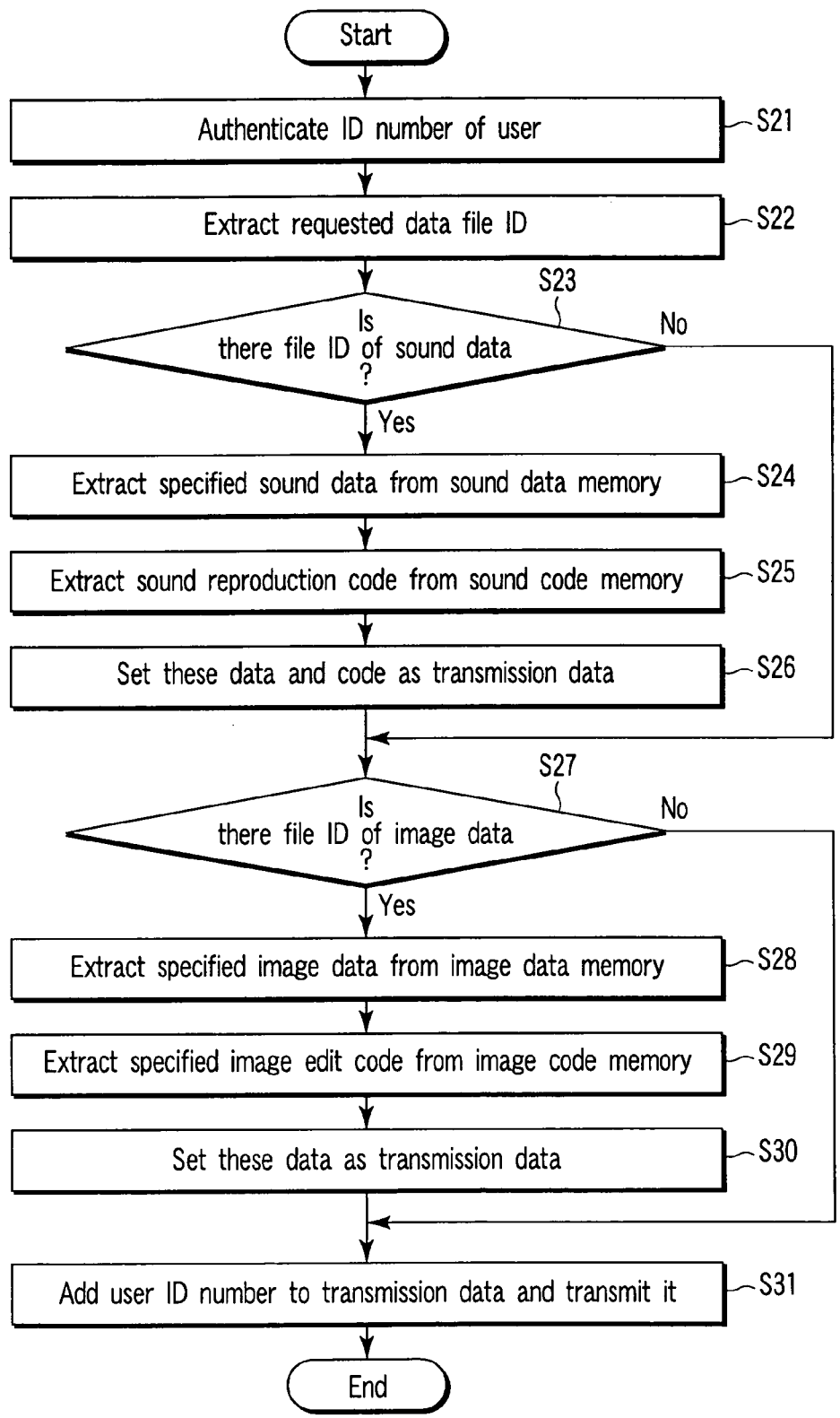
FIG. 6 is a flowchart illustrating the operation of extraction of requested data on the server side.

FIG. 6 is a flowchart illustrating the operation of extracting request data in the server 2.

In Step S21, the data request accepting unit 11 extracts the ID number of the user from the received information, and authenticate the ID number. In other words, the data request accepting unit 11 checks if the ID number is admitted or not, and if admitted, the process can proceed from that point on.

In Step S22, the data request accepting unit 11 extracts the file ID of the requested data from the received information. In Step S23, if it is "Yes", that is, if there is the file ID of the sound data, the sound data editing unit 12 is initiated.

In Step S24, the sound data editing unit 12 searches through the contents data memory 15 for the data specified by the sound data file ID, and extracts the sound data of the specified language from the sound data memory 20. In Step S25, the sound data editing unit 12 extracts a sound reproduction code 17b from the sound code memory 17, and in Step S26, the sound data and sound reproduction code are set as the transmission data.

The sound reproduction code 17b is a code for restoring sound data that has been compressed by a certain format into a reproducible form as sound, and reproducing it. That is, the sound reproduction code 17b is essential to reproduce sounds in the user terminal 3.

In Step S27, the data request accepting unit 11 checks if there is a file ID of image data in the received information. In Step S27, if it is "Yes", that is, if there is the file ID of the image data, the image data editing unit 13 is initiated.

In Step S28, the sound data editing unit 13 searches through the contents data memory 15 for the data specified by the image data file ID, and extracts the image data from the image data memory 20. In Step S29, the image data editing unit 13 extracts an image edit code 19b from the image code memory 19, and in Step S30, the image data and image edit code are set as the transmission data.

The image edit code 19b is a code for restoring image data that has been compressed by a certain format into a displayable form as image, and displaying it. That is, the image edit code 19b is essential to execute the process for displaying images in the user terminal 3.

After the above-described processing, the data transmitting unit 14 adds the ID number of the user to the transmission data and transmits it to the user terminal 3 in Step S31.

The user terminal 3 carries out the sound reproduction process and image display process based on the received data.

Figure 7:
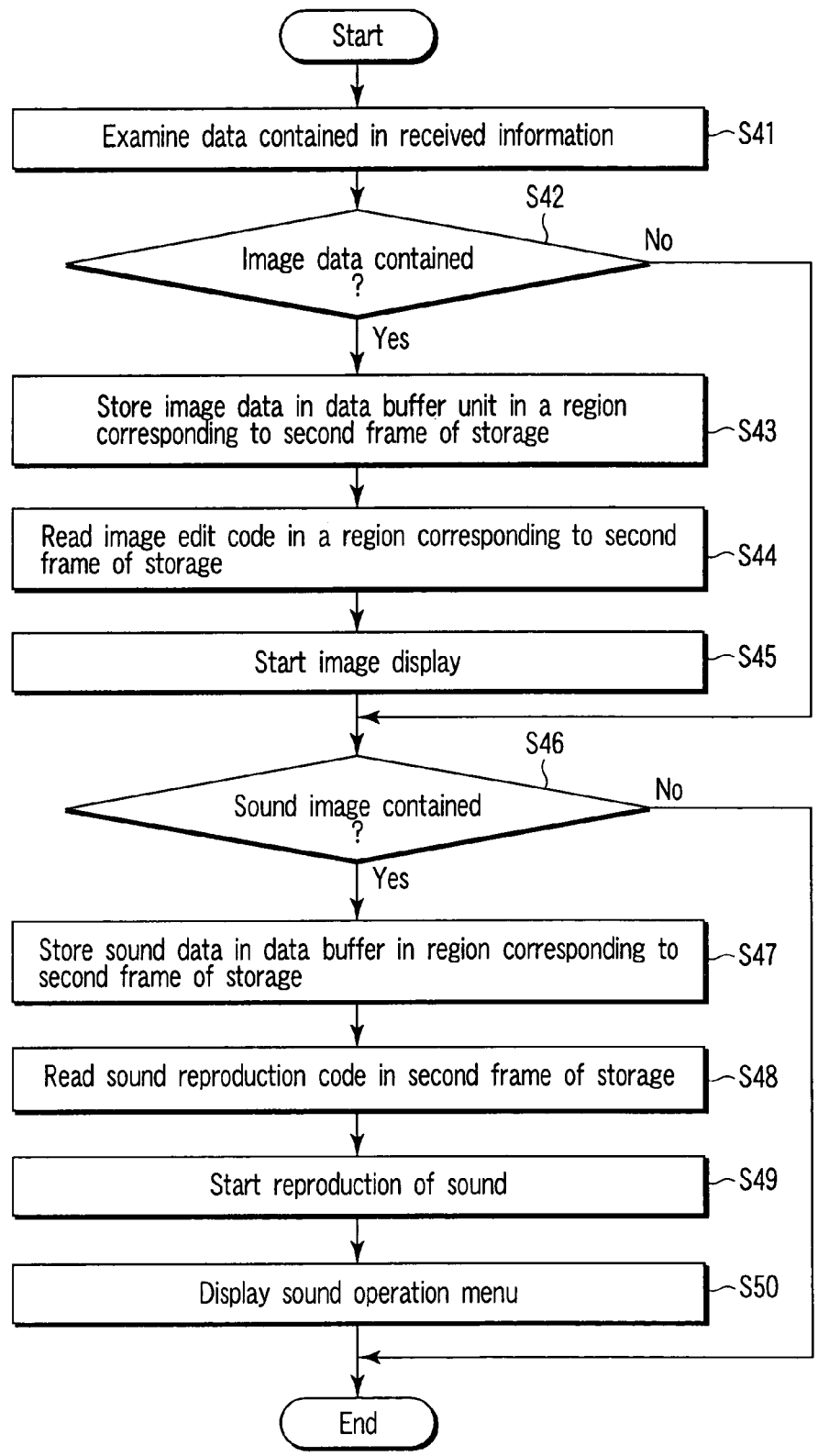
FIG. 7 is a flowchart illustrating the output operation to an input/output device based on received data.

FIG. 7 is a flowchart illustrating the output operation of the user terminal 3 to the input/output device 4.

In Step S41, the received data accepting unit 28 checks if image data or sound data is contained in the information received from the server 2. In Step S42, if it is "Yes", that is, if there is image data contained in the information, the received data accepting unit 28 initiates the image data processing unit 30.

In Step S43, the image data processing unit 30 stores the image data in the data buffer unit 35 in a region of the storage, which corresponds to the second frame. Then, in Step S43, an image edit code 19b extracted from the above-described transmission data sent out from the server 2 is read as a code corresponding to the second frame 41 set to be hidden underneath. In Step S45, the image edit code 19b is executed, and thus a new image display that corresponds to the event information of the first frame is started.

Figure 8:
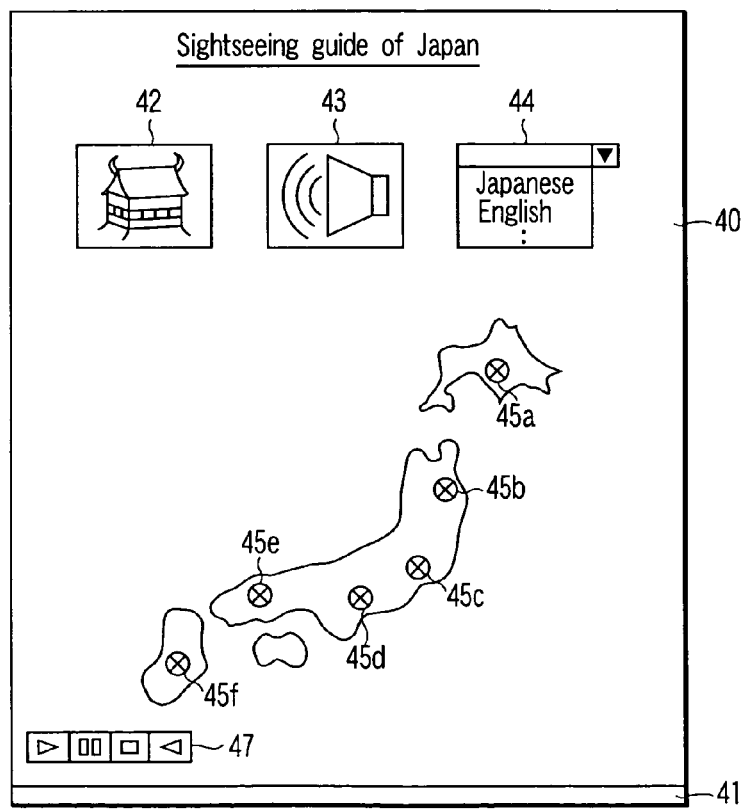
FIG. 8 is a diagram illustrating an image of contents.

By this process, an image that corresponds to the clicked one of the before-mentioned image menu icons 45a to 45f is displayed on the image display region 42 in the contents display shown in FIG. 8.

In Step S46, if it is "Yes", that is, if the sound data is contained in the received information, the audio data processing unit 29 is initiated.

In Step S47, the audio data processing unit 29 stores the audio data in the above-described data buffer unit 35. Then, in Step S48, a sound reproduction code 17b extracted from the above-described transmission data sent out from the server 2 is read as a code corresponding to the second frame 41 set to be hidden underneath. In Step S49, the sound reproduction code 17b is executed and thus the sound data is converted into an ordinary data format. Thus converted data is sent to the sound outputting unit 31 and the reproduction of the data as sound is started via the speaker 5. Further, at the same time as the reproduction of the sound, a sound operation menu 47 is displayed on the contents display. The sound operation menu 47 is formed based on the codes contained in the sound reproduction code 17b.

The user, when clicking a sound icon 43, can hear the explanations for the specifications of the contents display, how to use it, etc. in voice. Further, when the user clicks any one of the menu icons 45a to 45f, an image of its sightseeing spot is displayed in the image display region 42, and the information of the sightseeing spot is played back in voice from the speaker. In this manner, the user can listen to the explanation in voice output from the speaker while monitoring the image of the sightseeing spot of the clicked icon. Thus, as compared to the case of merely reading the information expressed in characters, more accurate information can be obtained more effectively.

Further, since the sound operation menu 47 is provided, the user is able to repeatedly reproduce the sound data that is stored in the data buffer unit 35.

In the case where both of image and sound are to be output, it is desired that the image is first output, and the sound is then reproduced after the image has been displayed. In this case, it is alternatively possible to take such a structure that information that instructs the display of the image before the reproduction of the sound is received from the server 2. For example, by adding the data indicating the order of reproduction to the information to be transmitted from the server 2, the above-described structure can be realized.

In this embodiment, an object as well as an instruction code for executing the object are transmitted from the server 2, and the instruction code is stored in a memory unit (storage) corresponding to the second frame, to be executed. In this manner, it is not necessary to transmit all the contents to be displayed on one frame unlike the conventional technique, but when the user needs data, only the data needed is transmitted from the server 2, thereby making it possible to significantly shorten the transmission time. Therefore, the user is able to obtain information without caring about the waiting time.

According to the present invention, of a plurality of frames, a pre-designated certain frame is used and an instruction code is stored in a memory unit (storage) that corresponds to its frame portion, to be executed. In this manner, the present invention provides a solution to the drawback of the conventional technique while maintaining the conformity with the present standards, and the object of solving the technique can be easily and certainly achieved with the present invention.

Further, in this embodiment, the second frame is set in a hidden state, and therefore the display region of the first frame will not be significantly eroded or the presence of the second frame will not be noticed by the user.

In the above-described embodiment, the explanation was made in connection with the case where the second frame is defined as a single frame; however it is alternatively possible to take such a structure that the second frame is defined as containing a plurality of sub-frames and each of these sub-frames is further defined as being independent from each other and having functions corresponding to those of the second frame.

In the just-described case, if, for example, an event occurring in connection with the first frame is of a menu for the information voice in Japanese, the data expressing the information voice in Japanese is associated with one of the sub-frames of the second frame and transferred from the server 2. After the information voice in Japanese was generated, if the user requests the corresponding information voice in English by causing such an event to occur with the operation made by the user, the data corresponding to the English voice information is associated with another one of the sub-frames of the second frame, and transferred from the server 2.

In the embodiment, a Japanese voice that was associated with and transferred to one of the sub-frames of the second frame and then temporarily stored in a memory unit (storage) corresponding to that frame portion can be repeatedly generated without having to wait for the data transfer from the server each time the Japanese voice is to be generated. Similarly, an English voice that has been associated with and transferred to another one of the sub-frames of the second frame and temporarily stored in another memory unit (storage) corresponding to that frame portion can be repeatedly generated without having to wait for the data transfer from the server each time the English voice is to be generated.

In the above-described variation of the embodiment, the second frame is divided into a plurality of sub-frames and each sub-frame is made to have the equivalent functions as those of the second frame. Alternatively, it is further possible to take such a structure that in place of defining divided and set frames as sub-frames, the functions respectively corresponding to the sub-frames are defined independently as the third, fourth, . . . n-th frames, and these frames are made to function as the sub-frames of the second frame.

It should be noted that in this embodiment, the sound information and image information are handled; however the present invention is not limited to this form, but it can be applied to the other type of information, for example, character information. In generally, the present invention can be applied to any kind of object.

Further, the system described in connection with the above-described embodiment can be realized by making a program that is stored in a memory medium that is not shown, read in a computer.

Such a program is a data transfer program that is to be realized on a computer to execute the followings. That is, the display image of the monitor applied to the processing terminal of the user is divided into a plurality of frames. The program is designed to make the computer to execute a function of defining, of these divided frames, the first group frame as such that occurrence of an event corresponding to a mark or a marked indicator in a display region of the monitor is recognizable, and the second group frame as such that when data corresponding to the event that occurs in connection with the first group frame, are transferred from the server, thus received data are stored in the storage as the data for the second group frame, and a function of substantially limiting the data to those corresponding to information specified based on the event that occurred in connection with the first group, transferring thus limited data from the server as data for the second group frame, and storing them in an applicable storage of the processing terminal, and a function of executing the renewal of an image or reproduction of sound or the like, which corresponds to the event in connection with the first group frame, with the data stored in the storage as the data for the second group frame.

The main body of the user terminal 3 serving as an information processing terminal corresponds to the above-mentioned computer.

Here, the memory medium of the present invention can be of any storing format as long as it can store the program and read by a computer.

Further, the memory medium of the present invention includes such a case where there may be a plurality of memory media involved to execute the process of the described embodiment and the media may be of any structure.

The information processing terminal that can operates under the control of the above-described program functions as a device comprising a display region defining function unit of defining, of these divided frames, the first group frame as such that occurrence of an event corresponding to a mark or a marked indicator in a display region of the monitor is recognizable, and the second group frame as such that when data corresponding to the event that occurs in connection with the first group frame, are transferred from the server, thus received data are stored in the storage as the data for the second group frame, and a data transfer control unit of substantially limiting the data to those corresponding to information specified based on the event that occurred in connection with the first group, transferring thus limited data from the server as data for the second group frame, storing them in an applicable storage of the processing terminal, and executing the renewal of an image or reproduction of sound or the like, which corresponds to the event in connection with the first group frame, with the data stored in the storage as the data for the second group frame.

In the above-described device, either one or both of the display region defining function unit and data transfer control unit operate under the control of the program transferred from the server. Here, the supply of the program to the information processing terminal may be carried out via the above-described information recording medium, but it is recommended that the program should be supplied from the server via a transmission line in succession or all at once in batch.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information rewriting method comprising:
    defining to divide a display image of a monitor applied to a processing terminal on a user side into a plurality of frames, the divided frames being defined to include at least a first group of frames and second group of frames, wherein the first group of frames are defined to recognize occurrence of an event corresponding to a mark or a marked indicator in a display region of the monitor, and the second group of frames are defined when data corresponding to the event that occurs in connection with the first group of frames are transferred from the server to store received data in a storage as the data for the second group of frames;
    substantially limiting the data to those corresponding to information specified based on the event that occurred in connection with the first group;
    transferring the limited data from the server as data for the second group of frames;
    storing the data in the storage of the processing terminal; and
    executing renewal of an image or reproduction of sound, which corresponds to the event in connection with the first group of frames, with the data stored in the storage as the data for the second group of frames.

2. The information rewriting method according to claim 1, wherein sound information is specified by the event occurring in the first group of frames, data corresponding to the specified sound information is transferred from the server as those corresponding to the second group of frames;
    storing the data in the storage of the processing terminal; and
    reproducing the data corresponding to the specified sound information on the processing terminal.

3. The information rewriting method according to claim 1, wherein image information is specified by the event occurring in the first group frame, data corresponding to the specified image information is transferred from the server as those corresponding to the second group of frames;
    storing the data in the storage of the processing terminal; and
    reproducing the data corresponding to the specified image information on the first group of frames.

4. The information rewriting method according to claim 1, wherein the second group of frames is defined as an invisible frame.

5. The information rewriting method according to claim 1, wherein the first group of frames is defined as a single frame.

6. The information rewriting method according to claim 1, wherein the second group of frames is defined as a plurality of frames.

7. The information rewriting method according to claim 6, wherein the above-mentioned plurality of second group of frames are defined to involve transmission and reception of data independent from each other.

8. An information terminal device which receives information transmitted from a server through a communication line, and rewrites stored information associated with the received information, the information terminal device comprising:
    display control means for dividing a browser image displayed on the information terminal device into a first frame and a second frame based on the information transmitted from the server, the first frame functioning to select event information, the second frame functioning to perform rewriting based on reply information related to the event information, and also reproduce the reply information;
    recognition means for detecting the event information selected in first frame image, and recognizing the detected event information as event information selected in the second frame;
    event-associated information requesting means for requesting the server to transmit information associated with the recognized event information; and
    information rewriting means for recognizing new information transmitted from the server as the information associated with the second frame, based on the information associated with the event information, and rewriting information associated with the event information selected in the first frame into the new information,
    wherein the display control means rewrites a corresponding region of the first frame in the browser image based on an output of the information rewriting means.

9. A recording medium storing information rewriting program for use on a computer to execute:
    a function of defining to divide a display image of a monitor applied to a processing terminal of a user into a plurality of frames, wherein of the divided frames, a first group of frames are defined to recognize occurrence of an event corresponding to a mark or a marked indicator in a display region of the monitor, and a second group of frames are defined when data corresponding to the event that occurs in connection with the first group of frames are transferred from the server to store received data in a storage as the data for the second group of frames;

a function of substantially limiting the data to those corresponding to information specified based on the event that occurred in connection with the first group, transferring the limited data from the server as data for the second group of frames, and storing them in the storage of the processing terminal; and a function of executing the renewal of an image or reproduction of sound or the like, which corresponds to the event in connection with the first group of frames, with the data stored in the storage as the data for the second group of frames.

10. An information terminal device comprising:

a display region defining function unit configured to define to divide a display image of a monitor applied to a processing terminal of a user into a plurality of frames, of the divided frames, the first group of frames are defined to recognize occurrence of an event corresponding to a mark or a marked indicator in a display region of the monitor, and the second group of frames are defined, when data corresponding to the event that occurs in connection with the first group of frames, are transferred from the server, to store received data in a storage as the data for the second group of frames; and a data transfer control unit configured to substantially limit the data to those corresponding to information specified based on the event that occurred in connection with the first group, transfer the limited data from the server as data for the second group of frames, store them in the storage of the processing terminal, and execute the renewal of an image or reproduction of sound, which corresponds to the event in connection with the first group of frames, with the data stored in the storage as the data for the second group of frames.

11. The information terminal device according to claim 10, wherein either one or both of the display region defining function unit and data transfer control unit operate under the control of the program transferred from the server.

12. An information rewriting method of an information terminal device which receives information transmitted from a server through a communication line, and rewrites stored information associated with the received information, the information rewriting method comprising:

dividing a browser image displayed on the information terminal device into a first frame for use in selecting event information and a second frame different from the first frame, and issuing a first command for requesting the server to transmit related information associated with the first and second frames;

storing in a storage unit, divided image information and the related information associated with the first and second frames, which are transmitted from the server in response to the first command;

displaying at least an image for use in selecting event information, in the first frame based on the divided image information and the related information;

recognizing the event information selected in the first frame image as event information selected in the second frame, and issuing a second command for requesting the server to transmit information associated with the event information, based on the related information associated with the second frame which is stored in the storage unit; and recognizing new information transmitted from the server in response to the second command, as the information associated with the second frame, and rewriting information stored in the storage unit as information associated with the event information selected in the first frame into the recognized new information.

13. The information rewriting method according to claim 12, wherein the new information transmitted from the server associated with the second frame includes a server program for use in communicating with the server and a processing program for use in processing event information generated in the first frame and the new information transmitted from the server.

14. The information rewriting method according to claim 12, wherein when the new information is image information, an image corresponding to the event information selected in the first frame is re-displayed in place of the new information.

15. The information rewriting method according to claim 12, wherein when the event information selected in the first frame is information related to sound, in the displayed image, a height of the second frame is set to 0 and the second frame is in an invisible state.

16. The information rewriting method according to claim 12, wherein when the event information is sound information, sound information associated with the event information selected in the first frame is reproduced by a sound reproduction unit.

17. The information rewriting method according to claim 12, wherein:

the first frame comprises a plurality of frames each of which generates respective event information; and the second frame issues a third command to the server, the third command being for requesting the server to transmit information corresponding to the event information generated in each of the plurality of frames as event information generated in the second frame.

18. A recording medium storing information rewriting program for controlling an information terminal device which receives specific information transmitted from a server through a communication line, and which rewrites stored information associated with the specific information, the program causing a computer to perform:

a function of dividing a browser image displayed on the information terminal device into a first frame for use in selecting event information and a second frame different from the first frame, and issuing a first command for requesting the server to transmit related information associated with the first and second frames;

a function of storing in a storage unit, divided image information and the related information associated with the first and second frames, which are transmitted from the server in response to the first command;

a function of causing at least an image for use in selecting event information to be displayed in the first frame of the information terminal device based on the divided image information and the related information;

a function of recognizing the event information selected in the first frame image as event information selected in the second frame, and issuing a second command for requesting the server to transmit information associated with the event information, based on the related information associated with the second frame which is stored in the storage unit; and a function of recognizing new information transmitted from the server in response to the second command, as the information associated with the second frame, and rewriting information stored in the storage unit as information associated with the event information selected in the first frame into the recognized new information.

19. An information rewriting method of an information terminal device which receives information transmitted from a server through a communication line, and rewrites stored information associated with the received information, the information rewriting method comprising:

a step of dividing a browser image displayed on the information terminal device into a first frame for use in selecting event information and a second frame different from the first frame, and issuing a first command for requesting the server to transmit related information associated with the first and second frames;

a step of storing divided image information and the related information associated with the first and second frames, which are transmitted from the server in response to the first command, in a storage unit;

a step of displaying at least an image for use in selecting event information, in the first frame based on the divided image information and the related information;

a step of recognizing the event information selected in the first frame image as event information selected in the second frame; and issuing a second command for requesting the server to transmit information associated with the event information, based on the related information associated with the second frame which is stored in the storage unit;

a step of recognizing new image information and new sound information which are transmitted from the server in response to the second command, as the information associated with the second frame, and rewriting information stored in the storage unit as information associated with the event information selected in the first frame into the recognized new image and sound information;

a step of replacing an image corresponding to image information selected in the first frame by the new image information, and re-displaying the new image information; and a step of causing a sound reproduction unit to reproduce sound information associated with the event information selected in the first frame.

20. The information rewriting method of the information terminal device according to claim 19, wherein in the first frame, a plurality of image display areas for displaying respective reduced images are arranged, respective reduced image selection areas are arranged in association with the reduced images to display event information, and the image display areas are rewritten.

* * * * *